James Hollingsworth,
Horse-Stall Floor.
Nº 90,172. Patented May 18, 1869.
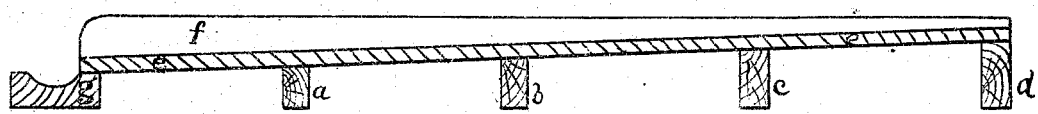
Fig. 1
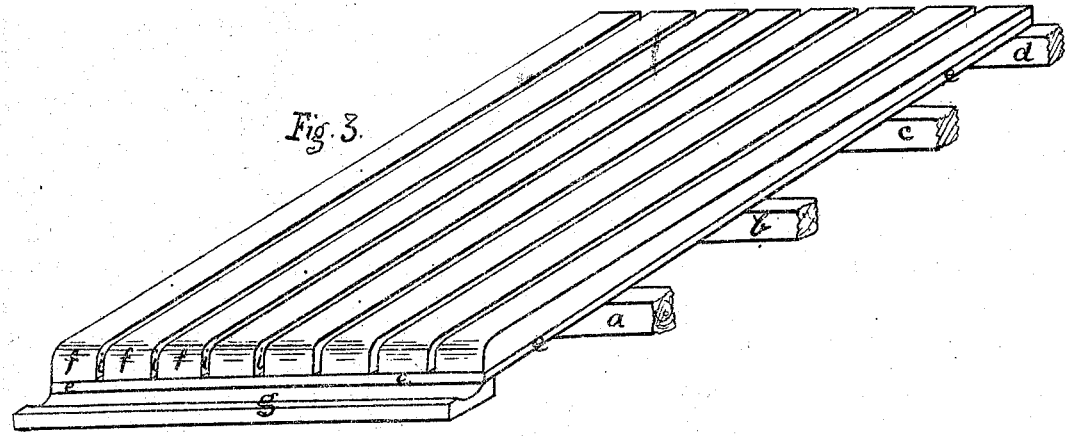
Fig. 3
Fig. 2
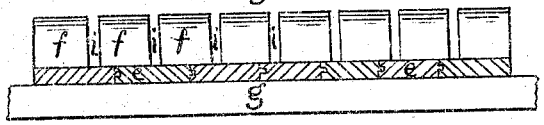
Witnesses
John M Van Orden
R T Crane
Inventor
James Hollingsworth

United States Patent Office.

JAMES HOLLINGSWORTH, OF CHICAGO, ILLINOIS.

Letters Patent No. 90,172, dated May 18, 1869.

IMPROVEMENT IN HORSE-STALL FLOORS.

The Schedule referred to in these Letters Patent and making part of the same.

*To all whom it may concern:*

Be it known that I, JAMES HOLLINGSWORTH, of the city of Chicago, county of Cook, and State of Illinois, have invented a new and useful Mode of Constructing and Putting Down the Floors of Stalls for Horses, and other animals, possessing, as I believe, four important and useful features, namely:

First, by this improvement, I secure a steep incline to carry off the urine, while I maintain a level standing for the animal.

Secondly, this improvement will save its whole cost in bedding every three months, while it insures cleanliness and comfort to the animal, and pleasure to the owner.

Thirdly, time saved in grooming, because the animals cannot get foul in their own offal.

Fourthly, this improvement entirely obviates the injurious effect produced upon the feet and limbs of animals by standing on inclined floors, especially when the incline is sufficient to secure the object sought for.

The nature of my improvement and invention consists in placing on an inclined floor parallel strips, or slats, at about three-eighths inch distance apart, the slats cut tapering, so that their upper surfaces will be in a horizontal plane, while the floor, on which the slats rest, is an inclined plane.

This arrangement allows the water falling upon the slats to pass downward between them to the surface of the inclined floor, when it passes to a trough, or gutter formed in the floor, or it may pass directly down at the ends of the slats, by means of holes bored in the floor, or carried off by means of the trough or gutter before named.

To enable others skilled in the arts to make and use my invention, I will proceed to describe its construction and operation, reference being had to the accompanying drawings, and to the letters of reference thereon.

Figure 1 represents a side view of the stall-floor;
Figure 2, an end view; and
Figure 3, a perspective view of the same.

$a\ b\ c\ d$ represent the joists or sleepers on which the stall-floor rests.

$e\ e$, the inclined tight floor.

$f\ f\ f\ f$, &c., the slats, or strips, cut tapering, and secured by nailing to floor $e\ e$.

$i\ i\ i$, &c., show the spaces between the slats.

$g$ represents the trough, or gutter, at the foot of the slats.

The operation is such, that urine from the animal standing upon the horizontal surface of the slats $f\ f$, will pass down between the slats in the space $i\ i$, and run off on the inclined plane $e\ e$, to the trough, or gutter $g$.

The advantages of this construction are—

First, the animal stands on a horizontal floor, avoiding the strain incident to standing on inclined floors;

Second, the comfort of the animal, in having a dry bed to lie down upon;

Third, the time and labor saved in grooming, as well as the great saving in bedding; and Fourth, animals can be well cared for and kept perfectly clean by small boys, unable to groom a filthy animal.

I do not claim the invention of inclined floors for animal-stalls, either when laid close, or with slats, leaving a space between; but What I do claim as my invention, and desire to secure by Letters Patent, is—

The inclined floor $e$, slats $f\ f$, and trough $g$, all constructed, combined, and arranged in the manner and for the purpose herein described.

JAMES HOLLINGSWORTH.

Witnesses:
W. H. WALTERS,
S. WANZER.